United States Patent
Kwon et al.

(10) Patent No.: US 9,537,154 B2
(45) Date of Patent: Jan. 3, 2017

(54) ANODE FOR SECONDARY BATTERY AND SECONDARY BATTERY HAVING THE SAME

(71) Applicant: LG Chem, Ltd., Seoul (KR)

(72) Inventors: Yo-Han Kwon, Daejeon (KR); Sang-Wook Woo, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 87 days.

(21) Appl. No.: 14/554,658

(22) Filed: Nov. 26, 2014

(65) Prior Publication Data

US 2015/0147617 A1 May 28, 2015

(30) Foreign Application Priority Data

Nov. 27, 2013 (KR) .................. 10-2013-0145424
Nov. 26, 2014 (KR) .................. 10-2014-0166581

(51) Int. Cl.
| | |
|---|---|
| *H01M 4/70* | (2006.01) |
| *H01M 4/75* | (2006.01) |
| *H01M 4/66* | (2006.01) |
| *H01M 4/134* | (2010.01) |
| *H01M 10/04* | (2006.01) |
| *H01M 10/0525* | (2010.01) |
| *H01M 10/058* | (2010.01) |
| *H01M 4/36* | (2006.01) |

(Continued)

(52) U.S. Cl.
CPC .................. *H01M 4/75* (2013.01); *C25D 5/14* (2013.01); *C25D 7/0607* (2013.01); *H01M 4/134* (2013.01); *H01M 4/366* (2013.01); *H01M 4/661* (2013.01); *H01M 10/0422* (2013.01); *H01M 10/058* (2013.01); *H01M 10/0525* (2013.01); *C25D 3/12* (2013.01); *C25D 3/562* (2013.01); *H01M 4/0452* (2013.01); *H01M 4/387* (2013.01); *H01M 10/052* (2013.01); *Y02E 60/122* (2013.01)

(58) Field of Classification Search
CPC .... H01M 4/75; H01M 10/0422; H01M 4/366; H01M 4/661; H01M 10/0525; H01M 10/058; H01M 4/134; H01M 4/0452; H01M 10/052; H01M 4/387; C25D 7/0607; C25D 5/14; C25D 3/12; C25D 3/562; Y02E 60/122
See application file for complete search history.

(56) References Cited

U.S. PATENT DOCUMENTS 3,839,090 A * 10/1974 Morelock .............. H01M 4/64
429/211
2005/0074673 A1    4/2005 Park et al.
(Continued)

FOREIGN PATENT DOCUMENTS

| JP | 2011023241 A | 2/2011 |
| KR | 100382767 B1 | 5/2003 |

(Continued)

*Primary Examiner* — Cynthia K Walls
(74) *Attorney, Agent, or Firm* — Lerner, David, Littenberg, Krumholz & Mentlik, LLP (57) ABSTRACT

The present disclosure provides an anode for a secondary battery, comprising a wire-type current collector; a metallic anode active material layer formed on the surface of the wire-type current collector and comprising a metallic anode active material; and an inert metal layer formed on the surface of the metallic anode active material layer and having no reactivity with lithium.

12 Claims, 4 Drawing Sheets

(51) Int. Cl.
*C25D 5/14* (2006.01)
*C25D 7/06* (2006.01)
H01M 4/38 (2006.01)
H01M 4/04 (2006.01)
H01M 10/052 (2010.01)
C25D 3/12 (2006.01)
C25D 3/56 (2006.01)

(56) References Cited

U.S. PATENT DOCUMENTS

| | | | |
|---|---|---|---|
| 2007/0048609 A1* | 3/2007 | Ueda | H01M 4/134 |
| | | | 429/218.1 |
| 2008/0145752 A1* | 6/2008 | Hirose | H01M 2/0285 |
| | | | 429/164 |
| 2011/0014518 A1 | 1/2011 | Nakai et al. | |
| 2014/0050979 A1 | 2/2014 | Woo et al. | |
| 2014/0170453 A1 | 6/2014 | Kwon et al. | |
| 2014/0178726 A1 | 6/2014 | Kwon et al. | |

FOREIGN PATENT DOCUMENTS

| | | | | |
|---|---|---|---|---|
| KR | 20080056632 A | 6/2008 | | |
| KR | 10-2012-0113685 | 10/2012 | | |
| KR | 10-2013-0040160 | 4/2013 | | |
| KR | 20130045220 A | 5/2013 | | |
| WO | WO 2005/098994 | * 10/2005 | | H01M 2/10 |

\* cited by examiner

ANODE FOR SECONDARY BATTERY AND SECONDARY BATTERY HAVING THE SAME

CROSS-REFERENCE TO RELATED APPLICATION(S)

This application claims priority to Korean Patent Application No. 10-2013-0145424 filed in the Republic of Korea on Nov. 27, 2013, and Korean Patent Application No. 10-2014-0166581 filed in the Republic of Korea on Nov. 26, 2014, which are incorporated herein by reference.

TECHNICAL FIELD

The present disclosure relates to an anode for a secondary battery, more specifically an anode having a metallic anode active material layer and an inert metal layer, and a secondary battery comprising the anode.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape, and linear batteries have been proposed as a battery having good flexibility and a very high ratio of length relative to cross-sectional diameter.

However, when the linear battery is a cable-type secondary battery, external physical impact such as bending is frequently applied to the battery due to the structural characteristic of the battery, so a short circuit may highly occur. Also, when an anode active material such as Si and Sn is used in the battery, it may be released by the expansion and contraction of the battery during repeated charging and discharging processes. In addition, when an anode active material layer made of a metal becomes thick for the purpose of capacity increase, it is difficult for lithium ions to be distributed in the anode active material layer, thereby resulting in insufficient battery capacity.

DISCLOSURE

Technical Problem

The present disclosure is designed to solve the above-mentioned problems, and therefore the present disclosure is directed to provide an anode for a secondary battery that has a region capable of preventing or inhibiting the release of a metallic anode active material layer by volume expansion during charge and discharge, can solve the isolation of the metallic anode active material layer by virtue of good electrical conductivity, and can improve cycle life characteristics.

Technical Solution

In accordance with one aspect of the present disclosure, there is provided an anode for a secondary battery, comprising a wire-type current collector; a metallic anode active material layer formed on the surface of the wire-type current collector and comprising a metallic anode active material; and an inert metal layer formed on the surface of the metallic anode active material layer and having no reactivity with lithium.

The wire-type current collector may be made of stainless steel; aluminum; nickel; titanium; sintered carbon; copper; stainless steel treated with carbon, nickel, titanium or silver on the surface thereof; an aluminum-cadmium alloy; a non-conductive polymer treated with a conductive material on the surface thereof; or a conductive polymer.

The conductive material may be any one selected from the group consisting of polyacetylene, polyaniline, polypyrrole, polythiophene, polysulfurnitride, indium tin oxide (ITO), copper, silver, palladium, nickel, and a mixture thereof.

The conductive polymer may be a polymer selected from the group consisting of polyacetylene, polyaniline, polypyrrole, polythiophene, polysulfurnitride, and a mixture thereof.

The metallic anode active material may be an active material selected from the group consisting of a metal (Me) of Si, Sn, Li, Zn, Mg, Cd, Ce, Ni or Fe; an alloy of the metal; an oxide (MeOx) of the metal; a complex of the metal and carbon; and a mixture thereof.

The inert metal may be an active material selected from the group consisting of nickel, copper, iron, vanadium (V), manganese, cobalt, and a mixture thereof.

The inert metal layer may be formed by way of plating.

The anode for a secondary battery may further comprise a conductive layer formed to surround the outer surface of the inert metal layer and comprising a mixture of a conductive material and a polymer binder.

The conductive material may be any one selected from the group consisting of carbon black, acetylene black, Ketjen black, Denka black, carbon fiber, and a mixture thereof.

The polymer binder may be any one selected from the group consisting of polyvinylidene fluoride-co-hexafluoro propylene, polyvinylidene fluoride-co-trichloro ethylene, polymethyl methacrylate, polybutylacrylate, polyacrylonitrile, polyvinylpyrrolidone, polyvinylacetate, polyvinylalcohol, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, styrene-butadiene rubber, carboxyl methyl cellulose, and a mixture thereof.

In accordance with another aspect of the present disclosure, there is provided an anode for a secondary battery, comprising a spiral anode consisting of at least two wire-type anodes being spirally twisted with each other, each of the wire-type anodes comprising a wire-type current collector, and a metallic anode active material layer formed on the surface of the wire-type current collector and comprising a metallic anode active material; and an inert metal layer formed on the surface of the spiral anode and having no reactivity with lithium.

The twist rate of the spiral electrode may be in the range of 0.01 to 10 mm per one twist.

The anode for a secondary battery may further comprise a conductive layer formed to surround the outer surface of the inert metal layer and comprising a mixture of a conductive material and a polymer binder.

In accordance with still another aspect of the present disclosure, there is provided a secondary battery comprising a cathode, an anode, and a separation layer, wherein the anode is the above-mentioned anode for a secondary battery.

The separation layer may be an electrolyte layer or a separator.

In accordance with yet still another aspect of the present disclosure, there is provided a cable-type secondary battery, comprising: a core including an electrolyte and for supplying lithium ions; an inner electrode surrounding the core for supplying lithium ions; a separation layer formed by filling to surround the inner electrode, the separation layer acting as an ion channel; an outer electrode surrounding an outer surface of the separation layer, and acting as a cathode having a cathode active material layer and a cathode current collector; and a protection coating surrounding an outer surface of the outer electrode, wherein the inner electrode is the above-mentioned anode being spirally wound to have a space for receiving the core for supplying lithium ions therein.

The inner electrode may have an open structure.

The separation layer may be an electrolyte layer or a separator.

The electrolyte layer may comprise an electrolyte selected from a gel polymer electrolyte using PEO, PVdF, PMMA, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt.

The lithium salt may be any one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

The separator may be a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made of a mixture of inorganic particles and a binder polymer.

The outer electrode may have any one of a structure that the cathode active material layer is formed to surround the outer surface of the separation layer, and the cathode current collector is formed to surround the outer surface of the cathode active material layer;

a structure that the cathode current collector is formed to surround the outer surface of the separation layer, and the cathode active material layer is formed to surround the outer surface of the cathode current collector;

a structure that the cathode current collector is formed to surround the outer surface of the separation layer, and the cathode active material layer is formed to surround the outer surface of the cathode current collector and to come into contact with the separation layer; and a structure that the cathode active material layer is formed to surround the outer surface of the separation layer, and the cathode current collector is formed to be included inside the cathode active material layer by being covered therein and to surround the outer surface of the separation layer with spacing apart therefrom.

The cathode current collector may be in the form of a pipe, a wound wire, a wound sheet or a mesh.

The cathode current collector may be made of stainless steel; aluminum; nickel; titanium; sintered carbon; copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

In accordance with yet still another aspect of the present disclosure, there is provided a cable-type secondary battery, comprising:

two or more cores each including an electrolyte and for supplying lithium ions;

two or more inner electrodes, each inner electrode surrounding one of the two or more cores for supplying lithium ions;

a separation layer surrounding respective outer surfaces of the two or more inner electrodes to prevent a short circuit between electrodes; and an outer electrode surrounding an outer surface of the separation layer and having an outer electrode active material layer and an outer current collector, wherein the inner electrode is the above-mentioned anode being spirally wound to have a space for receiving the core for supplying lithium ions therein.

In accordance with yet still another aspect of the present disclosure, there is provided a cable-type secondary battery, comprising:

two or more cores each including an electrolyte and for supplying lithium ions;

two or more inner electrodes, each inner electrode surrounding one of the two or more cores for supplying lithium ions;

two or more separation layers, each separation layer surrounding an outer surface of each inner electrode to prevent a short circuit between electrodes; and an outer electrode surrounding respective outer surfaces of the two or more separation layers and having an outer electrode active material layer and an outer current collector, wherein the inner electrode is the above-mentioned anode being spirally wound to have a space for receiving the core for supplying lithium ions therein.

Advantageous Effects

The anode of the present disclosure comprises a metal layer having good electrical conductivity without alloying/ dealloying with lithium, on a metallic anode active material layer, thereby preventing the isolation or release of a metallic anode active material by sever volume expansion during charge and discharge, and eventually providing improved cycle life characteristics.

DESCRIPTION OF DRAWINGS

The accompanying drawing illustrates a preferred embodiment of the present disclosure and, together with the foregoing disclosure, serves to provide further understanding of the technical spirit of the present disclosure. However, the present disclosure is not to be construed as being limited to the drawings.

EXPLANATION OF REFERENCE NUMERALS 100, 200, 300, 400: Anode
500, 600, 700, 800: Cable-type secondary battery
110, 210, 310, 410: Wire-type current collector
120, 220, 320, 420: Metallic anode active material layer
130, 230, 330, 430: Inert metal layer
240, 440: Conductive layer
510, 610, 710, 810: Core for supplying lithium ions
520, 620, 720, 820: Inner electrode
550: Outer electrode
540, 650, 750, 830: Separation layer
660, 760, 850: Cathode active material layer
670, 770, 860: Cathode current collector
560, 680, 780, 870: Protection Coating

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
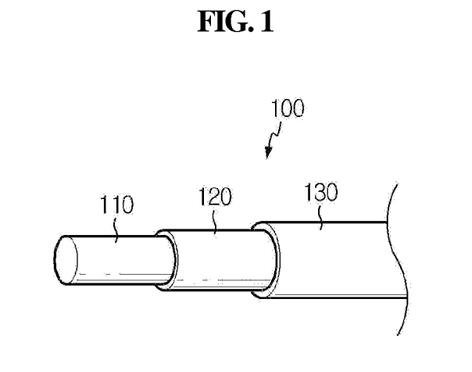
FIG. 1 is a perspective view showing an anode according to a preferred embodiment of the present disclosure.

FIG. 1 schematically shows an anode having a metallic anode active material layer and an inert metal layer according to the present disclosure. However, the configurations illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

Referring to FIG. 1, the anode 100 of the present disclosure comprises a wire-type current collector 110; a metallic anode active material layer 120 formed on the surface of the wire-type current collector 110 and comprising a metallic anode active material; and an inert metal layer 130 formed on the surface of the metallic anode active material layer 120 and having no reactivity with lithium.

Generally, a metal such as Si and Sn, and a compound containing such a metal are used as an anode material having high capacity, but these materials exhibit electrochemical characteristics through alloying/dealloying with Li ions due to its inherent properties, and thus undergo severely large volume change due to expansion which may decay the structure of batteries. This volume change weakens the electronic contact between metal active materials, thereby inhibiting the transfer of Li ions into the anode active material layer to cause cycle deterioration and to increase the resistance of the battery. However, the anode 100 according to one embodiment of the present invention further comprises the inert metal layer 130 on the surface of the metallic anode active material layer 120 to have no reaction such as alloying/dealloying with lithium. Also, the inert metal layer 130, which is made of a metal with good electrical conductivity, serves to alleviate the isolation of the metallic anode active material, thereby preventing the deterioration of cycles and the increase of battery resistance.

Also, the metallic anode active material layer 120 exhibits a relatively high reaction potential, relative to a graphite-based active material, so the reaction potential of a battery discharge profile becomes low. Therefore, the use of the metallic anode active material layer in batteries may reduce energy density, as compared with the use of graphite-based active material. In order to solve this matter, the anode 100 according to one embodiment of the present disclosure further has the inert metal layer 130 on the surface of the metallic anode active material layer 120 to raise the reaction potential of the battery and maintain a high level of energy density.

The inert metal layer may comprise any inert metal that has no reactivity with lithium, i.e. is not subject to alloying or dealloying with lithium, and has good electrical conductivity. Examples of the inert metal may include nickel, iron, vanadium (V), manganese, copper, cobalt, and a mixture thereof, but are not limited thereto.

The inert metal layer may be formed by way of electroplating on the wire-type current collector that has the metallic anode active material layer on the surface thereof. The wire-type current collector which is used in the present disclosure is not limited to its kinds, and may be made of stainless steel; aluminum; nickel; titanium; sintered carbon copper; stainless steel treated with carbon, nickel, titanium or silver on the surface thereof; an aluminum-cadmium alloy; a non-conductive polymer treated with a conductive material on the surface thereof; or a conductive polymer.

The conductive material may be any one selected from the group consisting of polyacetylene, polyaniline, polypyrrole, polythiophene, polysulfurnitride, indium tin oxide (ITO), copper, silver, palladium, nickel, and a mixture thereof, but is not limited thereto.

The conductive polymer is not limited to its kinds, and may be a polymer selected from the group consisting of polyacetylene, polyaniline, polypyrrole, polythiophene, polysulfurnitride, and a mixture thereof.

The metallic anode active material 120 may be an active material selected from the group consisting of a metal (Me) of Si, Sn, Li, Zn, Mg, Cd, Ce, Ni or Fe; an alloy of the metal; an oxide (MeOx) of the metal; a complex of the metal and carbon; and a mixture thereof.

Also, the anode according to one embodiment of the present disclosure may be an anode having a porous metallic anode active material layer formed by an electroplating process or an anodic oxidation process on the outer surface of the wire-type current collector. In the case that the metallic anode active material layer is formed by electroplating on the surface of the current collector, the metallic anode active material layer can have 3-dimensional pore structure having the desired pore size by controlling the amount of hydrogen gas being generated and the size of hydrogen bubble being generated. In the case that the metallic anode active material layer made of a metal oxide is formed by anodic oxidation on the surface of the current collector, the metallic anode active material layer can have a pore structure in the form of one-dimensional channel by controlling the amount of oxygen gas and the size of oxygen bubble that are generated under anodic oxidation conditions.

Figure 2:
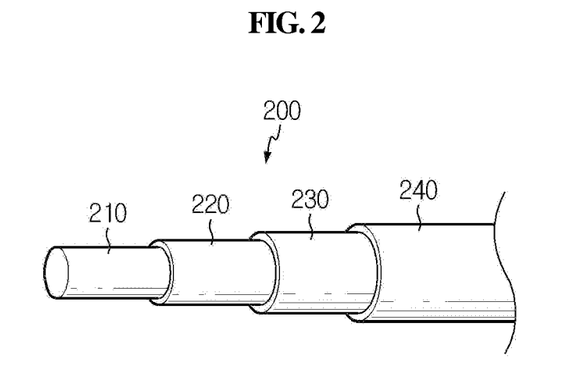
FIG. 2 is a perspective view showing an anode that further has a conductive layer, according to a preferred embodiment of the present disclosure.

Referring to FIG. 2, an anode 200 of according to one embodiment of the present disclosure may optionally have a conductive layer 240 on the surface thereof. The conductive layer 240 can inhibit the isolation of an anode active material and the formation of another new surface, thereby minimizing side reactions with an electrolyte solution. Also, since the conductive layer 240 comprises a polymer binder, it can easily carry an organic electrolyte solution into a metallic anode active material layer 220.

The conductive layer may comprise a conductive material selected from the group consisting of carbon black, acetylene black, Ketjen black, Denka black, carbon fiber, and a mixture thereof may be used, but it is not limited thereto. Also, the conductive layer may comprise a polymer binder selected from the group consisting of polyvinylidene fluoride-co-hexafluoro propylene, polyvinylidene fluoride-co-trichloro ethylene, polymethyl methacrylate, polybutylacrylate, polyacrylonitrile, polyvinylpyrrolidone, polyvinylacetate, polyvinylalcohol, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, styrene-butadiene rubber, carboxyl methyl cellulose, and a mixture thereof, but is not limited thereto.

Figure 3:
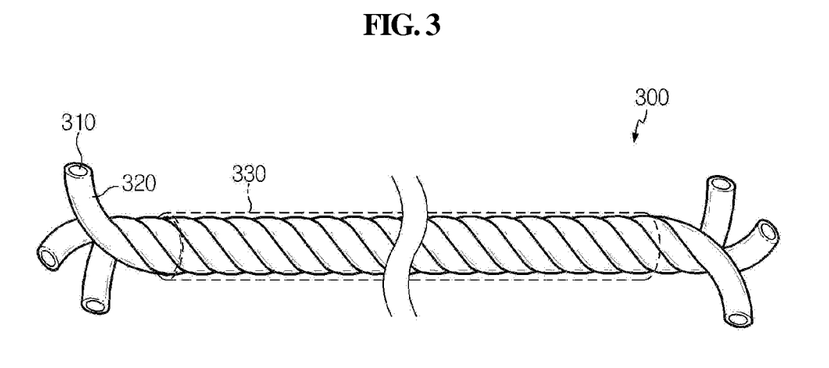
FIG. 3 is a perspective view showing an anode that has a spiral anode, according to a preferred embodiment of the present disclosure.

Referring to FIG. 3, an anode 300 of the present disclosure comprises a spiral anode consisting of at least two wire-type anodes being spirally twisted with each other, each of the wire-type anodes comprising a wire-type current collector 310, and a metallic anode active material layer 320 formed on the surface of the wire-type current collector 310 and comprising a metallic anode active material; and an inert metal layer 330 formed on the surface of the spiral anode and having no reactivity with lithium.

The anode 300 according to one embodiment of the present disclosure uses a spiral anode to increase a surface area to react with Li ions during charging and discharging processes, thereby improving battery performances. Also, in the anode, the metallic anode active material layer 320 can be controlled to have a thin thickness, thereby improving the rate characteristics of a battery. In addition, there is space present between the several strands in the spiral anode, which can alleviate stress or pressure applied in the battery during a charging and discharging process, e.g., the expansion of active material layers, to prevent the deformation of the battery and ensure the stability thereof, thereby improving the life characteristic of the battery. Further, the anode of the present disclosure has the inert metal layer 330 to prevent the isolation or release of the metallic anode active material layer by the severe volume expansion during charging and discharging processes.

The twist rate of the spiral electrode is in the range of 0.01 to 10 mm per one twist, preferably 0.1 to 5 mm per one twist. The twist rate is obtained by dividing the length of the anode wire by the number of twists. The lower value the twist rate has, the higher a twist degree is. When the twist rate is greater than 10 mm per one twist, a contact area between wire-type anodes 10 is so small that the increase of surface area is insignificant. When the twist rate is lower than 0.01 mm per one twist, a twist degree becomes so excessive that it may damage the wire-type anodes 10, such so that the anode active material layer may be peeled off and the current collector may be ruptured.

Figure 4:
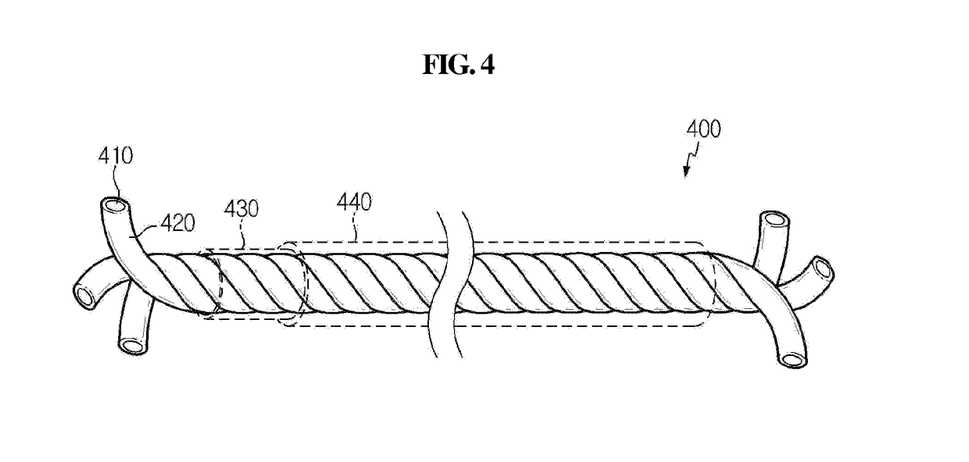
FIG. 4 is a perspective view showing an anode that has a spiral anode and further has a conductive layer, according to a preferred embodiment of the present disclosure.

Also, referring to FIG. 4, an anode 400 according to one embodiment of the present disclosure uses a spiral anode, and further has a conductive layer 440 which can inhibit the isolation of an anode active material and the formation of another new surface, thereby minimizing side reactions with an electrolyte solution.

The above-mentioned anode according to one embodiment of the present disclosure is combined with a cathode to compose an electrode structure, and has a separation layer to prepare a lithium secondary battery. The cathode and electrolyte composing the electrode structure may be those which have been conventionally used in the preparation of secondary batteries.

The separation layer may be an electrolyte layer or a separator.

Further, in accordance with yet still another aspect of the present disclosure, there is provided a cable-type secondary battery, comprising: a core including an electrolyte and for supplying lithium ions; an inner electrode surrounding the core for supplying lithium ions; a separation layer formed by filling to surround the inner electrode, the separation layer acting as an ion channel; an outer electrode surrounding an outer surface of the separation layer, and acting as a cathode having a cathode active material layer and a cathode current collector; and a protection coating surrounding an outer surface of the outer electrode, wherein the inner electrode is the above-mentioned anode being spirally wound to have a space for receiving the core for supplying lithium ions therein. The inner electrode may have an open structure.

Figure 5:
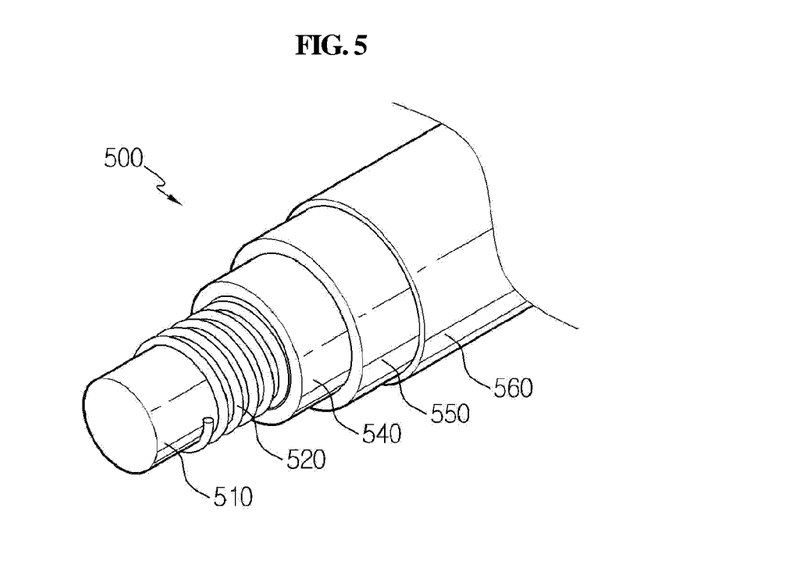
FIG. 5 is a perspective view showing a cable-type secondary battery, comprising an anode according to a preferred embodiment of the present disclosure.

Referring to FIG. 5, a cable-type secondary battery 500 of the present disclosure has a core 510 including an electrolyte and for supplying lithium ions; an inner electrode 520 surrounding the core for supplying lithium ions; a separation layer 540 formed by filling to surround the inner electrode, the separation layer acting as an ion channel; an outer electrode 550 surrounding an outer surface of the separation layer, and acting as a cathode having a cathode active material layer and a cathode current collector; and a protection coating 560 surrounding an outer surface of the outer electrode.

The inner electrode is obtained, so as to have a space for receiving the core for supplying lithium ions therein, by spirally winding the above-mentioned anode for a secondary battery according to one embodiment of the present disclosure, i.e., the anode for a secondary battery, comprising a wire-type current collector; a metallic anode active material layer formed on the surface of the wire-type current collector and comprising a metallic anode active material; and an inert metal layer formed on the surface of the metallic anode active material layer and having no reactivity with lithium.

Also, the inner electrode is obtained, so as to have a space for receiving the core for supplying lithium ions therein, by spirally winding the above-mentioned anode for a secondary battery according to another embodiment of the present disclosure, i.e., the anode for a secondary battery, comprising a spiral anode consisting of at least two wire-type anodes being spirally twisted with each other, each of the wire-type anodes comprising a wire-type current collector, and a metallic anode active material layer formed on the surface of the wire-type current collector and comprising a metallic anode active material; and an inert metal layer formed on the surface of the spiral anode and having no reactivity with lithium.

The conventional cable-type secondary batteries have an electrolyte layer which is interposed between an inner electrode and an outer electrode. In order for the electrolyte layer to isolate the inner electrode from the outer electrode and prevent a short circuit, the electrolyte layer should be made of gel-type polymer electrolytes or solid polymer electrolytes having a certain degree of mechanical properties. However, such gel-type polymer electrolytes or solid polymer electrolytes fail to provide superior performances as a source for lithium ions, so an electrolyte layer made of such should have an increased thickness so as to sufficiently provide lithium ions. Such a thickness increase in the electrolyte layer widens an interval between the electrodes to cause resistance increase, thereby deteriorating battery performances.

In contrast, the cable-type secondary battery according to one embodiment of the present invention has the core including an electrolyte and for supplying lithium ions, and the inner electrode of the present invention has an open structure. According to one embodiment of the present invention, such an open structure may be achieved by applying an inner current collector with an open structure in the inner electrode. Thus, the inner electrode has the open-structured inner current collector, the electrolyte of the core for supplying lithium ions can pass through the inner current collector to reach the inner electrode active material layer and the outer electrode active material layer. Accordingly, it is not necessary to excessively increase the thickness of an electrolyte layer. Also, an electrolyte layer may not be adopted as an essential component, and therefore, only a separator may be optionally used. Thus, the cable-type secondary battery of the present invention has the core including an electrolyte and for supplying lithium ions, to facilitate the penetration of an electrolyte into an electrode active material, and eventually facilitate the supply and exchange of lithium ions in electrodes, thereby exhibiting superior capacity and cycle characteristics.

Figure 6:
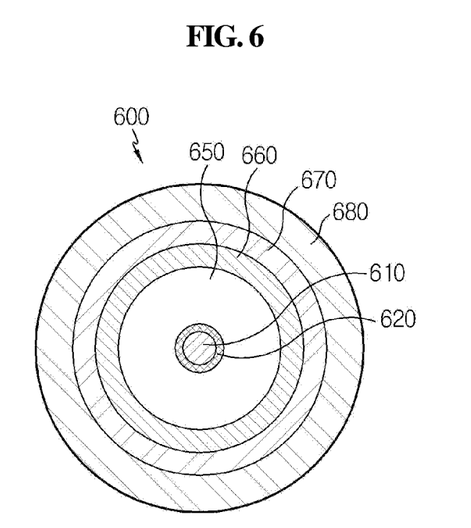
FIG. 6 is a cross-sectional view showing a cable-type secondary battery, comprising an anode according to a preferred embodiment of the present disclosure.

Referring to FIG. 6, a cable-type secondary battery 600 of the present disclosure comprises a core 610 including an electrolyte and for supplying lithium ions; an inner electrode 620 surrounding the core for supplying lithium ions; a separation layer 650 formed by filling to surround the inner electrode, the separation layer acting as an ion channel; an outer electrode surrounding an outer surface of the separation layer, and acting as a cathode having a cathode active material layer 660 and a cathode current collector 670; and a protection coating 680 surrounding an outer surface of the outer electrode, and the inner electrode 520 is obtained, so as to have a space for receiving the core for supplying lithium ions therein, by spirally winding the above-mentioned anode for a secondary battery according to one embodiment of the present disclosure. The inner electrode may have an open structure.

The separation layer may be an electrolyte layer or a separator.

The electrolyte layer may comprise an electrolyte selected from a gel polymer electrolyte using PEO, PVdF, PMMA, PAN, or PVAc; and a solid electrolyte using PEO, polypropylene oxide (PPO), polyether imine (PEI), polyethylene sulphide (PES), or polyvinyl acetate (PVAc). Also, the electrolyte may be a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP). The electrolyte further comprises a lithium salt, and the preferred examples of the lithium salt include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and mixtures thereof.

The separator may be, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made of a mixture of inorganic particles and a binder polymer. Among these, in order for the lithium ions of the core for supplying lithium ions to be transferred to the outer electrode, it is preferred to use a non-woven fabric separator corresponding to the porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

The outer electrode of such cable-type secondary battery acting as a cathode in which a cathode active material layer is coated on a cathode current collector, more specifically may have any one of a structure that the cathode active material layer is formed to surround the outer surface of the separation layer, and the cathode current collector is formed to surround the outer surface of the cathode active material layer (see FIG. 6); a structure that the cathode current collector is formed to surround the outer surface of the separation layer, and the cathode active material layer is formed to surround the outer surface of the cathode current collector; a structure that the cathode current collector is formed to surround the outer surface of the separation layer, and the cathode active material layer is formed to surround the outer surface of the cathode current collector and to come into contact with the separation layer; and a structure that the cathode active material layer is formed to surround the outer surface of the separation layer, and the cathode current collector is formed to be included inside the cathode active material layer by being covered therein and to surround the outer surface of the separation layer with spacing apart therefrom.

The cathode current collector may be, but is not limited thereto, in the form of a pipe, a wound wire, a wound sheet or a mesh.

The cathode current collector may be made of stainless steel; aluminum; nickel; titanium; sintered carbon; copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

The cathode active material is preferably a lithium-containing transition metal oxide, for example, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0\leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, $LiFePO_4$, and a mixture thereof. Also, a sulfide, selenide, or halide of such a lithium-containing transition metal may be used.

The outer electrode may comprise a cathode active material and a cathode current collector. Such an outer electrode may be obtained by first forming the cathode active material layer on the cathode current collector and then applying the resultant on the separation layer. For example, in the case that the cathode current collector is in the form of a wound sheet, the outer electrode active material layer may be first formed on the wound sheet-form current collector, followed by cutting into a piece having a predetermined size, to prepare a sheet-form outer electrode. Then, the prepared sheet-form outer electrode may be wound on the outer surface of the separation layer so that the outer electrode active material layer comes into contact with the separation layer, to form the outer electrode on the separation layer.

As another method, in the formation of the outer electrode, the cathode current collector may be first formed to surround the outer surface of the separation layer, and then followed by forming the cathode active material layer to surround the outer surface of the cathode current collector.

Meanwhile, in the case that the outer electrode is a structure having the cathode current collector formed to surround the outer surface of the separation layer, and the cathode active material layer formed to surround the outer surface of the cathode current collector and to come into contact with the separation layer, first, a cathode current collector, for example, in the form of a wire or sheet, is wound on the outer surface of the separation layer. The winding method is not particularly limited. For example, in the case of the wire-form current collector, the winding may be carried out by using a winding machine on the outer surface of the separation layer. Then, the cathode active material layer is formed by way of coating on the outer surface of the wound wire- or sheet-form cathode current collector so that the cathode active material layer surrounds the cathode current collector and comes into contact with the separation layer.

Also, in the case that the out electrode is a structure having the cathode active material layer formed to surround the outer surface of the separation layer, and the cathode current collector formed to be included inside the outer electrode active material layer by being covered therein and to surround the outer surface of the separation layer with spacing apart therefrom, first, on the outer surface of the separation layer, a part of the cathode active material layer to be finally obtained is formed, on which the cathode current collector is formed to surround the part of the cathode active material layer, and then the cathode active material layer is further formed on the cathode current collector to completely cover the cathode current collector. Thereby, the cathode current collector is disposed inside the cathode active material layer to improve an electric contact between the current collector and the active material, thereby enhancing battery characteristics.

The electrode active material, which is an anode active material or a cathode active material, is used together with a binder and a conductive material, and is combined with a current collector to configure an electrode. If the electrode is deformed by bending or severe folding due to external force, the electrode active material may be released. The release of the electrode active material deteriorates the performance and capacity of batteries. However, in the present disclosure, since the wound wire-form outer current collector has elasticity, it can disperse the applied force when such a deformation occurs by the external force, which causes only a slight deformation of the active material layer, thereby preventing the release of the active material.

Also, the cathode may be prepared by extrusion-coating an electrode slurry containing a cathode active material on a cathode current collector using an extruder. Also, the inner electrode may be the anode and it may be coated with the separation layer on the outside thereof or inserted into the separation layer. Thus, the cable-type secondary battery may be prepared by forming the inner electrode and the separation layer and then forming the outer electrode and a protective coating thereon. Alternatively, the cable-type secondary battery may be prepared by forming the outer electrode including the separation layer and the protective coating, and inserting the inner electrode in the separation layer; or forming the outer electrode and the protective coating, inserting the inner electrode and then filling the separation layer.

In the present disclosure, the protective coating is formed on the outer surface of the battery and acts as an insulator to protect the electrodes from moisture in air and external impact. The protective coating may be made of typical polymer resins, for example, PVC, high-density polyethylene (HDPE), or epoxy resin.

Hereinafter, cable-type secondary batteries having several anodes according to one embodiment of the present disclosure will be briefly explained for their structure with reference to FIGS. 7 and 8.

Figure 7:
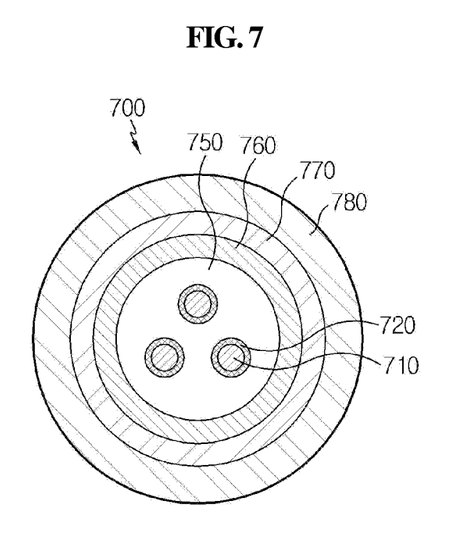
FIG. 7 is a cross-sectional view showing a cable-type secondary battery, comprising multiple anodes according to a preferred embodiment of the present disclosure.

Referring to FIG. 7, a cable-type secondary battery 700 according to one embodiment of the present disclosure comprises two or more cores 710 each including an electrolyte and for supplying lithium ions; two or more inner electrodes 720, each inner electrode surrounding one of the two or more cores for supplying lithium ions; a separation layer 750 surrounding respective outer surfaces of the two or more inner electrodes to prevent a short circuit between electrodes; an outer electrode acting as a cathode and having an outer electrode active material layer being a cathode active material layer 760 surrounding an outer surface of the separation layer and an outer current collector being a cathode current collector 770; and a protection coating 780 surrounding the outer electrode, wherein the inner electrode 720 is the above-mentioned anode being spirally wound to have a space for receiving the core for supplying lithium ions therein. The inner electrode may have an open structure.

Figure 8:
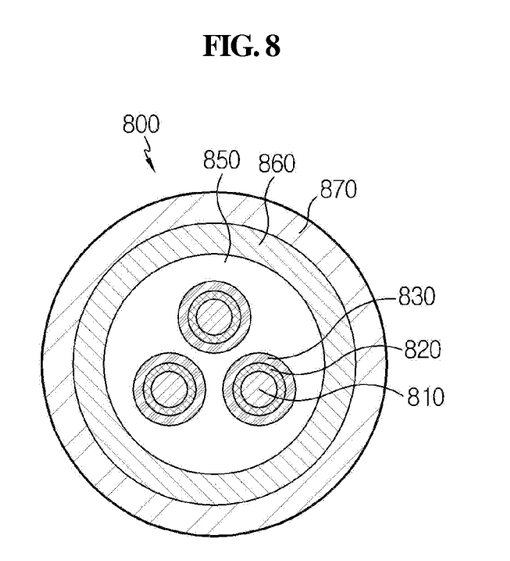
FIG. 8 is a cross-sectional view showing a cable-type secondary battery, comprising multiple anodes according to a preferred embodiment of the present disclosure.

Referring to FIG. 8, a cable-type secondary battery 800 according to one embodiment of the present disclosure comprises two or more cores 810 each including an electrolyte and for supplying lithium ions; two or more inner electrodes 820, each inner electrode surrounding one of the two or more cores for supplying lithium ions; two or more separation layers 830, each separation layer surrounding an outer surface of each inner electrode to prevent a short circuit between electrodes; an outer electrode acting as a cathode and having an outer electrode active material layer being a cathode active material layer 850 surrounding respective outer surfaces of the two or more separation layers and an outer current collector being a cathode current collector 860; and a protection coating 870 surrounding the outer electrode, wherein the inner electrode 820 is the above-mentioned anode being spirally wound to have a space for receiving the core for supplying lithium ions therein. The inner electrode may have an open structure.

Since such cable-type secondary batteries have an inner electrode comprising multiple anodes, a contact area increases to provide high battery rate. Also, the number of the anodes within the inner electrodes may be adjusted, thereby easily controlling the capacity balance between the inner electrode and the outer electrode.

In the cable-type secondary batteries having several anodes according to one embodiment of the present disclosure, the anode may be the anode for a secondary battery, comprising a wire-type current collector; a metallic anode active material layer formed on the surface of the wire-type current collector and comprising a metallic anode active material; and an inert metal layer formed on the surface of the metallic anode active material layer and having no reactivity with lithium.

In the cable-type secondary batteries having the inner electrode comprising several anodes, the outer electrode may have a structure that the cathode active material layer may be formed to surround the outer surface of the separation layer, and the cathode current collector may be formed to surround the outer surface of the cathode active material layer; a structure that the cathode current collector may be formed to surround the outer surface of the separation layer, and the cathode active material layer may be formed to surround the outer surface of the cathode current collector; a structure that the cathode current collector may be formed to surround the outer surface of the separation layer, and the cathode active material layer may be formed to surround the outer surface of the cathode current collector and to come into contact with the separation layer; or a structure that the cathode active material layer may be formed to surround the outer surface of the separation layer, and the cathode current collector may be formed to be included inside the cathode active material layer by being covered therein and to surround the outer surface of the separation layer with spacing apart therefrom.

Hereinafter, the present disclosure will be described in detail through specific examples. However, the description proposed herein is just a preferable example for the purpose of illustrations only, not intended to limit the scope of the invention, so it should be understood that the examples are provided for a better explanation to an ordinary person skilled in the art.

EXAMPLES

Example 1

Anode Having Inert Metal Layer

An electroplating solution containing 17.82 g of $NiCl_2 \cdot 6H_2O$, 39.48 g of $SnCl_2 \cdot 2H_2O$, 165.17 g of $K_2P_2O_7$, 9.38 g of $NH_2CH_2COOH$, 5 ml of 26% $NH_4OH$, 985.59 ml of distilled water was provided. A Cu current collector in the form of a wire (diameter 150 μm) was dipped in the electroplating solution, and an Sn plate was used as a counter electrode, followed by electroplating at a current density of 2.5 mA/cm² for 25.8 minutes, to obtain a wire-type current collector having a Ni—Sn anode active material layer of in a thickness of 2.5 μm.

Then, 240 g of $NiSO_4$, 45 g of $NiCl_2$, and 35 g of $H_3BO_3$ were added to 1 L of distilled water to obtain an electroplating solution for an inert metal layer. The Ni—Sn anode active material layer obtained above was dipped in the electroplating solution, and a Ni plate was used as a counter electrode, followed by electroplating at a current density of 5 mA/cm² for 5 minutes, to form a Ni metal layer on the surface of the Ni—Sn anode active material layer. Thereby, an anode was prepared.

Comparative Example 1

Anode Having No Inert Metal Layer

The procedures of Example 1 were repeated except that the formation of a Ni metal layer was not carried out, to prepare a Ni—Sn anode active material layer as an anode.

Experimental Examples

Preparation of Coin-Type Half Cell

A Li foil was used as a cathode, and each anode prepared in Example 1 and Comparative Example 1 was used. A polyethylene separator was interposed between the cathode and the anode to obtain an electrode assembly. The electrode assembly was put in a battery case, in which an electrolyte solution was introduced, the electrolyte solution being obtained by mixing ethylene carbonate and diethyl carbonate in a volume ratio of 1:2 and adding 1M $LiPF_6$ to the resulting non-aqueous solvent. Thereby, a coin-type half-cell was prepared.

Evaluation for Charge/Discharge Characteristics

The cells using each anode prepared in Example 1 and Comparative Example 1 were charged with a current density of 0.1 c up to 5 mV at constant current and then maintained with a constant voltage of 5 mV, and the charging was completed when a current density reached 0.005 C. Discharging was conducted with a current density of 0.1 c up to 1 V at constant current. Such a charging/discharging procedure was repeated 30 times under the same conditions.

Figure 9:
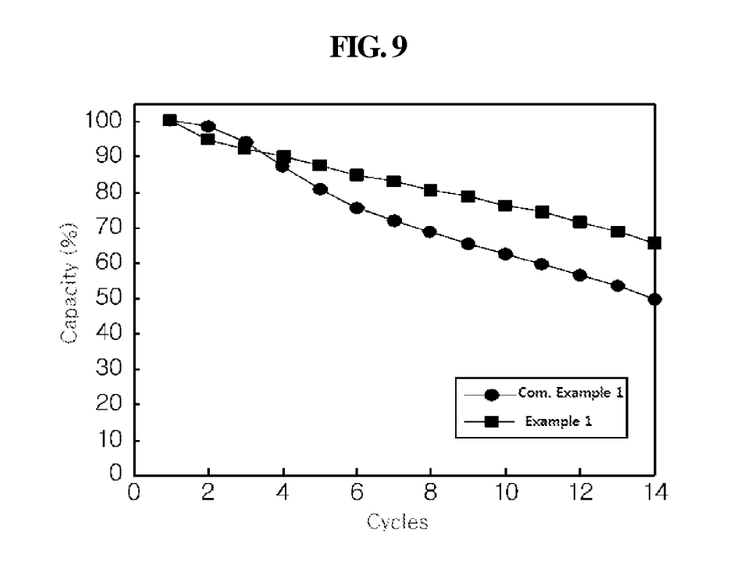
FIG. 9 is a graph showing the results of the performance test for coin-type half-cells prepared in Example 1 and Comparative Example 1.

From the evaluation results of the half-cells as shown in FIG. 9, the cell using the anode of Example 1 which has a Ni metal layer on the surface of a metallic anode active material layer was confirmed to alleviate the release of the a metallic anode active material layer by volume expansion and to provide electrical conductivity in the electrode, thereby exhibiting improved cycle life characteristics, as compared with the cell using the anode of Comparative Example 1.

What is claimed is:
1. An anode for a secondary battery, comprising:
a wire-type current collector; a metallic anode active material layer formed on the surface of the wire-type current collector and comprising a metallic anode active material; and
an inert metal layer formed on the surface of the metallic anode active material layer and having no reactivity with lithium; and a conductive layer formed to surround the outer surface of the inert metal layer and comprising a mixture of a first conductive material and a polymer binder.

2. The anode according to claim 1, wherein the wire-type current collector is made of stainless steel; aluminum; nickel; titanium; sintered carbon; copper; stainless steel treated with carbon, nickel, titanium or silver on the surface thereof; an aluminum-cadmium alloy; a non-conductive polymer treated with a second conductive material on the surface thereof; or a conductive polymer.

3. The anode according to claim 2, wherein the second conductive material is any one selected from the group consisting of polyacetylene, polyaniline, polypyrrole, polythiophene, polysulfurnitride, indium tin oxide (no), copper, silver, palladium, nickel, and a mixture thereof.

4. The anode according to claim 2, wherein the conductive polymer is a polymer selected from the group consisting of polyacetylene, polyaniline, polypyrrole, polythiophene, polysulfurnitride, and a mixture thereof.

5. The anode according to claim 1, wherein the metallic anode active material is an active material selected from the group consisting of a metal (Me) of Si, Sn, Li, Zn, Mg, Cd, Ce, Ni or Fe; an alloy of the metal; an oxide (MeOx) of the metal; a complex of the metal and carbon; and a mixture thereof.

6. The anode according to claim 1, wherein the inert metal is an active material selected from the group consisting of nickel, copper, iron, vanadium (V), manganese, cobalt, and a mixture thereof.

7. The anode according to claim 1, wherein the inert metal layer is formed by way of plating.

8. The anode according to claim 1, wherein the first conductive material is any one selected from the group consisting of carbon black, acetylene black, Ketjen black, Denka black, carbon fiber, and a mixture thereof.

9. The anode according to claim 1, wherein the polymer binder is any one selected from the group consisting of polyvinylidene fluoride-co-hexafluoro propylene, polyvinylidene fluoride-co-trichloro ethylene, polymethyl methacrylate, polybutylacrylate, polyacrylonitrile, polyvinylpyrrolidone, polyvinylacetate, polyvinylalcohol, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, styrene-butadiene rubber, carboxyl methyl cellulose, and a mixture thereof.

10. An anode for a secondary battery, comprising:
   a spiral anode consisting of at least two wire-type anodes being spirally twisted with each other, each of the wire-type anodes comprising a wire-type current collector, and a metallic anode active material layer formed on the surface of the wire-type current collector and comprising a metallic anode active material; and
   an inert metal layer formed on the surface of the spiral anode and having no reactivity with lithium.

11. The anode according to claim 10, wherein the spiral electrode has a twist rate of 0.01 to 10 mm per one twist.

12. The anode according to claim 10, which further comprises a conductive layer formed to surround the outer surface of the inert metal layer and comprising a mixture of a first conductive material and a polymer binder.

* * * * *